United States Patent [19]

Svensson

[11] Patent Number: 4,765,674
[45] Date of Patent: Aug. 23, 1988

[54] PIVOT BEARING FOR SUN VISOR ASSEMBLIES

[75] Inventor: E. Gunnar Svensson, Malung, Sweden

[73] Assignee: Autopart Sweden AB, Malung, Sweden

[21] Appl. No.: 13,875

[22] Filed: Feb. 12, 1987

[30] Foreign Application Priority Data

Mar. 19, 1986 [SE] Sweden ............................ 8601284

[51] Int. Cl.⁴ ............................................... B60J 3/02
[52] U.S. Cl. ............................. 296/97 K; 296/97 H; 248/900; 384/206; 384/296; 16/224
[58] Field of Search ............... 296/97 R, 97 H, 97 K; 16/257, 259, 224; 248/479, 900; 384/203, 206, 209, 295, 296

[56] References Cited

U.S. PATENT DOCUMENTS

| 2,038,906 | 4/1936 | Ruhland | 296/97 K |
| 3,497,908 | 3/1970 | Zamarra | 16/257 |
| 4,364,598 | 12/1982 | Viertel | 296/97 K |
| 4,380,860 | 4/1983 | Riester et al. | 384/203 X |

FOREIGN PATENT DOCUMENTS

| 2226827 | 3/1977 | Fed. Rep. of Germany . | |
| 1575432 | 9/1982 | Fed. Rep. of Germany | 384/206 |
| 1305142 | 8/1962 | France | 296/97 K |
| 1346774 | 7/1965 | France . | |
| 1043087 | 9/1966 | United Kingdom | 296/97 H |
| 2099069 | 12/1982 | United Kingdom . | |

*Primary Examiner*—Dennis H. Pedder
*Attorney, Agent, or Firm*—Young & Thompson

[57] ABSTRACT

A pivot axle bearing for a sun visor, the one end of which bearing is connected to the ceiling of a vehicle and the other end of which is connected to the sun visor. At least one end of the pivot axles of the sun visor is formed by at least one universal joint coupling, the component parts of which are resiliently connected together and which, when the sun visor is subjected to a force directed in the plane of the visor and exceeding a given magnitude, are forced out of engagement with one another. This ensures that a passenger will not be seriously injured by contact with the visor.

5 Claims, 2 Drawing Sheets

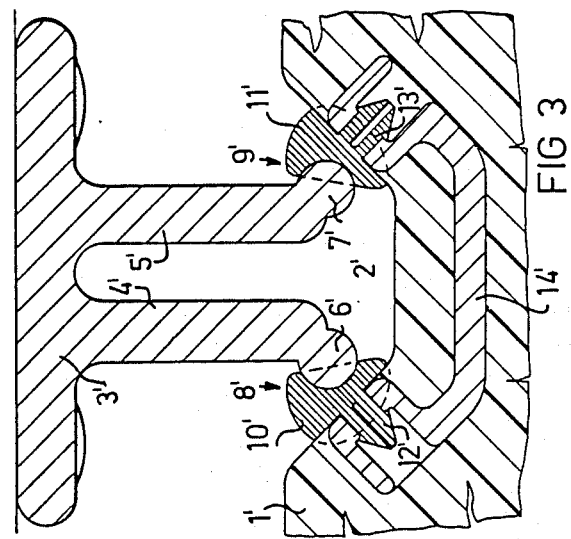
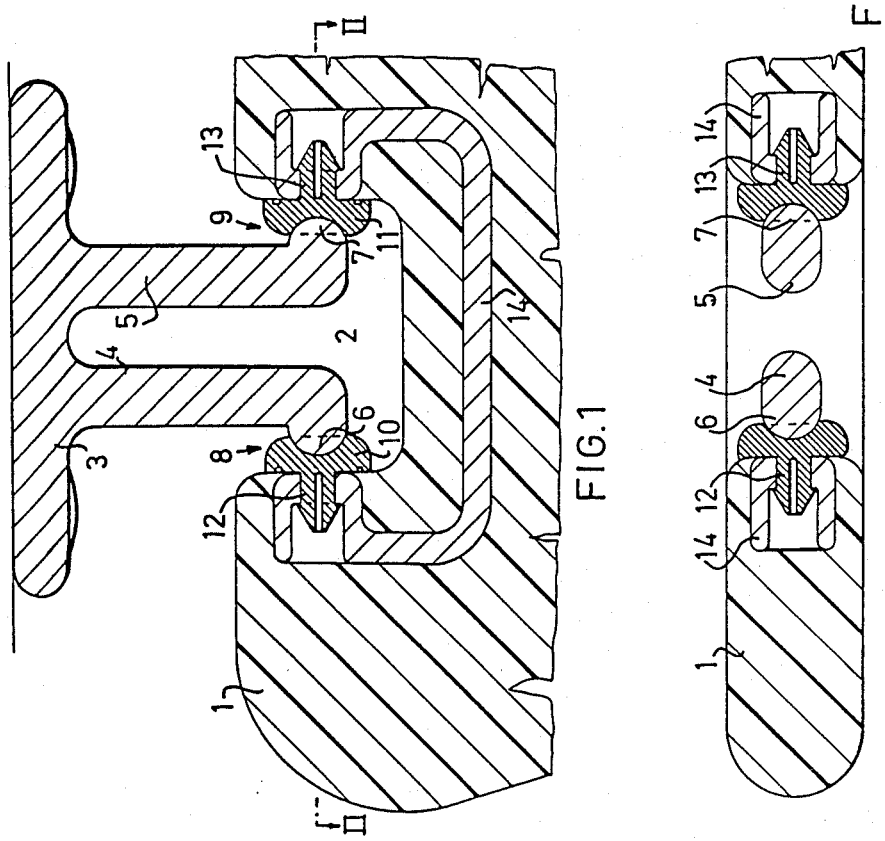

PIVOT BEARING FOR SUN VISOR ASSEMBLIES

The present invention relates to a pivot bearing for a sun visor assembly, the one end of which bearing is connected to the ceiling of a vehicle and the other end of which is connected to the sun visor.

Sun visor assemblies intended for automotive vehicles are normally provided with two separate, horizontal pivot axles located in the end parts of the upper side of the visor. The axle located nearest a side window in the vehicle is also able to swing or pivot about a vertical axis, so that the visor, or dazzle shield, can be swung towards the window. In order to provide for such pivotal movement of said axle, the other, horizontal pivot axle of the visor is detachably journalled in a bearing mounted on the ceiling of the vehicle, this bearing normally comprising an annulus which is made of a resilient material and in which part of the periphery is removed in order to enable the axle to be moved into and out of the bearing.

The safety requirements placed on the internal fittings and furniture of automotive vehicles have become far more stringent in recent years. Admittedly, the risk of a sun visor injuring a passenger who is thrown forwards in a vehicle, in the event of an accident or collision is extremely slight. However, if the visor is adjusted to an angular position at which the force exerted thereon by a forwardly moving passenger acts in a direction which lies precisely in the cross-sectional plane of the visor, it is not possible for a conventional visor to swing away under the impact, and, consequently the resultant reaction forces can cause serious injury to the passenger.

Accordingly, an object of the present invention is to provide a sun-visor bearing or journal arrangement with which injuries of this nature cannot occur.

This object is achieved by means of a pivot bearing of the aforesaid kind having the characterizing features set forth below. Thus, when a sun visor is journalled in bearing means according to the invention, the visor will be forced from its bearings if subjected to a force in the plane of the visor, wherewith the visor will either pivot to one side or fall onto the floor of the vehicle, depending on whether one or both of the visor axle attachments are provided with universal joint couplings in accordance with the invention.

The invention will now be described in more detail with reference to preferred embodiments of a pivot bearing according to the invention and with reference to the accompanying drawings, in which FIG. 1 is a sectional view of a first embodiment of a pivot bearing according to the invention;

FIG. 2 is a sectional view taken on the line II—II in FIG. 1;

FIG. 3 is a sectional view of a second embodiment of a pivot bearing according to the invention;

Figure 4:
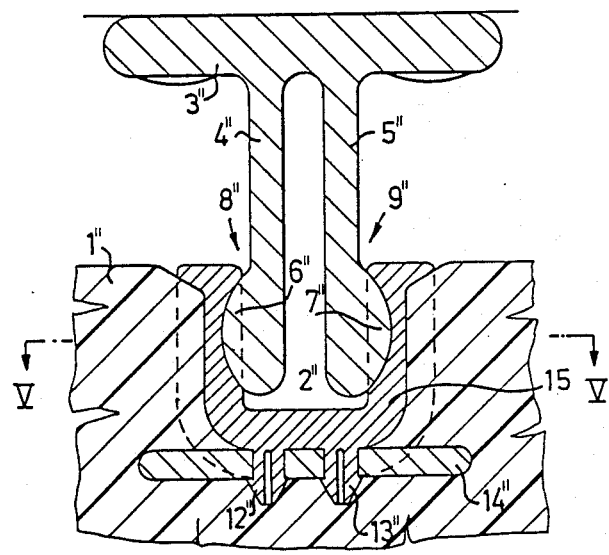
FIG. 4 is a sectional view of a third embodiment of a pivot bearing according to the invention.

The Figures illustrate a sun visor 1, or dazzle shield, having located conventionally therein a recess 2 for accommodating a pivot arrangement. As can be seen from the drawings, the visor 1 is uniplanar and the recess 2 extends entirely through the upper edge of the visor and opens through opposite sides of the visor. One end of a bearing or journal element 3 extends into the recess 2. In the embodiments illustrated, the bearing element 3 has the configuration of an inverted U and is made of a resilient material, such as to enable the limbs 4, 5 of the U to be biassed resiliently towards one another.

In the embodiment illustrated in FIGS. 1 and 2, each of the free ends of the limbs 4, 5 of the bearing element 3 has provided thereon a hemispherical bulbous protrusion 6, 7. These bulbous protrusions form the respective ball elements of universal joint coupling 8, 9, and co-act to this end with respective cup-shaped recesses formed in seating elements 10, 11 located on mutually opposing side surfaces of the visor recess. Each seating element 10, 11 presents a respective locking stud 12, 13, which terminates in respective locking tongues and which projects outwardly from the side of the seating element remote from the cup-shaped recess. The locking tongues are inserted through apertures located in each end of a U-shaped locking stirrup 14 arranged within the visor or shield.

Although only one end of the upper side of the sun visor assembly is shown in the drawing, it will be understood that the pivot axle bearing situated in the other end can be constructed in a like manner. In this case, however, the bearing element associated with said other end of the sun visor assembly is journalled to the ceiling of the vehicle in some suitable manner, so that said element can be swung about a vertical axis, as opposed to the illustrated bearing element, which is fixedly attached to the ceiling of the vehicle.

Furthermore, the universal coupling connections can also be formed in the ceiling of the vehicle, in which case the bearing cups intended to co-act with the ball elements on the, then upstanding, limbs of the U-shaped bearing element shall be located inwardly of the ceiling contours. For the purpose of providing in such constructions a suitable horizontal axle for forward and rearward pivoting movement of the sun visor assembly, the arrangement for connecting the bearing element to the visor may conveniently have the form of a swivel which need not be detachable. The resistance offered by the universal joint couplings to pivotal movement shall, in this case, be dimensioned so that the visor will swing about the visor swivel when manipulated in a normal fashion.

Analogous elements in the embodiments of FIGS. 3 and 4/5 are indicated by the same reference numeral with either a single or double suffix "prime" notation, respectively.

In the embodiment illustrated in FIG. 3, the side edges of the visor recess are inclined at an angle of 45° to the bottom of the recess, and converge in a direction towards said bottom. The ball elements are correspondingly inclined at an angle of 45° to the main axis of the limbs of the U-shaped bearing element.

Figure 5:
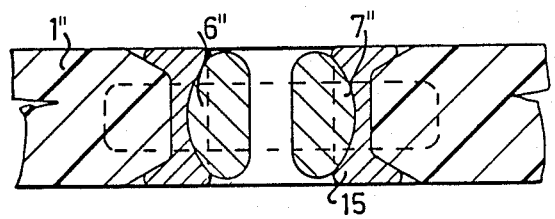
FIG. 5 is a sectional view taken on the line V—V in FIG. 4.

FIGS. 4 and 5 illustrate a third embodiment of a pivot bearing according to the invention. This pivot axle bearing differs from the embodiments described in the aforegoing, primarily in that the individual seating elements have been replaced with a single U-shaped attachment fitting 15 which has provided in the inner surfaces of the limbs of the recess cup-shaped recesses which correspond with the ball elements of the bearing element. In the embodiment of FIGS. 4 and 5 the ball elements have the form of spherical elements. It will be understood, however, that said elements may have a hemi-spherical configuration. The shape of the outer surfaces of the attachment fitting is complementary to the shape of the edge surfaces of the recess, and embrace said edge surfaces in a saddle-like manner. In the illustrated embodiment, the edge surfaces of the recess have the shape of a truncated triangle when seen in cross-section, although it will be understood that other cross-sectional shapes are conceivable. Located on the bottom of the attachment fitting are locking pegs 12", 13" which extend downwardly in towards the interior of the visor and there co-act with a locking stirrup 14", the upper surface of which, in this embodiment, lies flush with the bottom of the visor recess. Because the outer surfaces of the attachment fitting embrace the edge surfaces of the recess in a saddle-like manner, the seatings in which the ball elements seat are highly stable in the lateral direction.

The pivot bearing according to the invention can be fitted in position with considerable ease. The seating elements or the attachment fitting are, or is, pressed into the apertures in the locking stirrup, and the sun visor assembly is then delivered to the vehicle manufacturer. The recess in the visor is then pressed-in over the end of the bearing element until the ball elements snap into their respective seatings, the other end of the visor being connected to the ceiling of the vehicle. Since the ball elements shall be capable of being readily dislodged from their respective seatings, the sprung limbs of the bearing element are dimensioned so that the connection between ball and seating is retained intact during normal pivotal movement of the visor, but so that the ball elements will spring from their respective seatings when the visor is subjected to heavy forces, impacts etc.

Accordingly, the present invention provides a pivot bearing for a vehicle-mounted sun-visor assembly which will ensure that a passenger will not suffer serious injury as a result of colliding with the visor. The sun visor assembly according to the invention is of simple construction and comprises but few component parts which can be assembled together with comparative ease, and consequently the assembly is also an attractive item from the aspect of cost.

A number of modifications are conceivable within the scope of the invention. For example, the bearing element can be formed so that the ball elements thereof are urged against their respective seatings with a given biassing force, thereby to obtain the desired resistance to normal pivoting forces. In addition, it is possible, of course, to use a rigid bearing element and resilient seatings, this alternative being particularly suitable in those cases when the detachable pivot coupling is to be mounted on the ceiling of a vehicle, only one single universal joint coupling being required in this case. Finally, the joint between seating elements, or attachment fitting, and locking stirrup can be replaced with other types of joints, e.g. adhesive joints.

Consequently the invention is restricted solely by the scope of the following claims.

I claim:

1. A pivot bearing for a sun visor assembly, the bearing having a first part which is connected to the ceiling of an automotive vehicle and a second part which is connected to the upper edge of a uniplanar sun visor in an end part thereof, one said bearing part comprising a U-shaped bearing element having spaced limbs that have outwardly protruding ball elements on the ends thereof, said ball elements being accommodated in seatings on the other bearing part, the ball elements and the seatings together forming two ball joint couplings, said limbs of the U-shaped bearing element being resilient so as to ensure that the sun visor is released from the ceiling when subjected to forces exceeding a given magnitude and acting in the plane of the sun visor when said plane is disposed at an angle to said limbs, said seatings being carried by locking pegs which coact with apertures in a locking stirrup so as to form a snap-in coupling.

2. A pivot bearing as claimed in claim 1, in which said U-shaped bearing element is secured to the ceiling and said seatings are disposed in a recess on the upper edge of the visor.

3. A pivot bearing as claimed in claim 2, in which said recess extends entirely through said upper edge of the sun visor and opens through opposite sides of said sun visor.

4. A pivot bearing as claimed in claim 1, in which said apertures are disposed in legs of said stirrup which converge toward each other in a direction toward the U-shaped bearing elements and form angles of 45° with said limbs of the U-shaped bearing element.

5. A pivot bearing as claimed in claim 1, in which said stirrup is of U-shaped configuration and said openings are disposed in opposite limbs of said U-shaped stirrup.

* * * * *